Jan. 14, 1969 J. CHAPSKY 3,422,441

BINARY CODE DATA RECORDER SYSTEM

Filed Sept. 13, 1965 Sheet 1 of 4

INVENTOR:
Jacob Chapsky
By Keith D. Beecher
Attorney

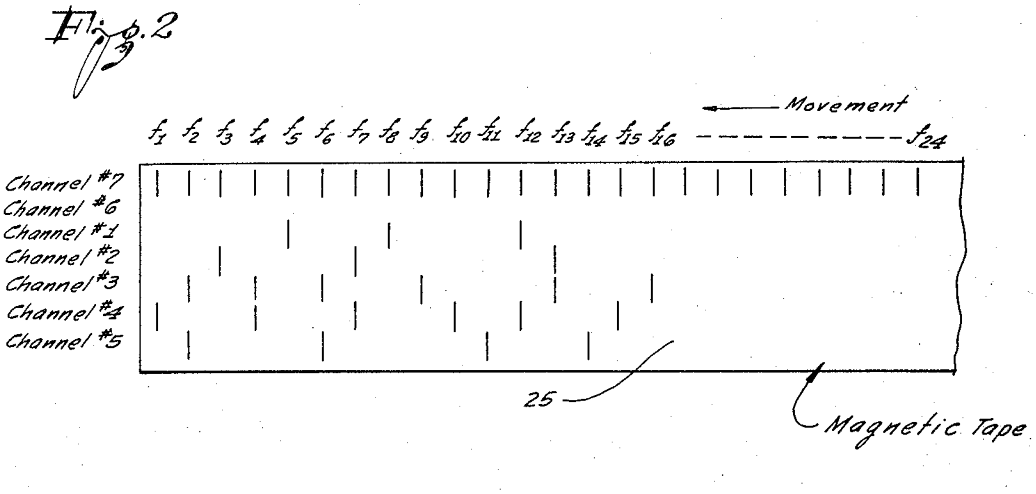
Fig. 2
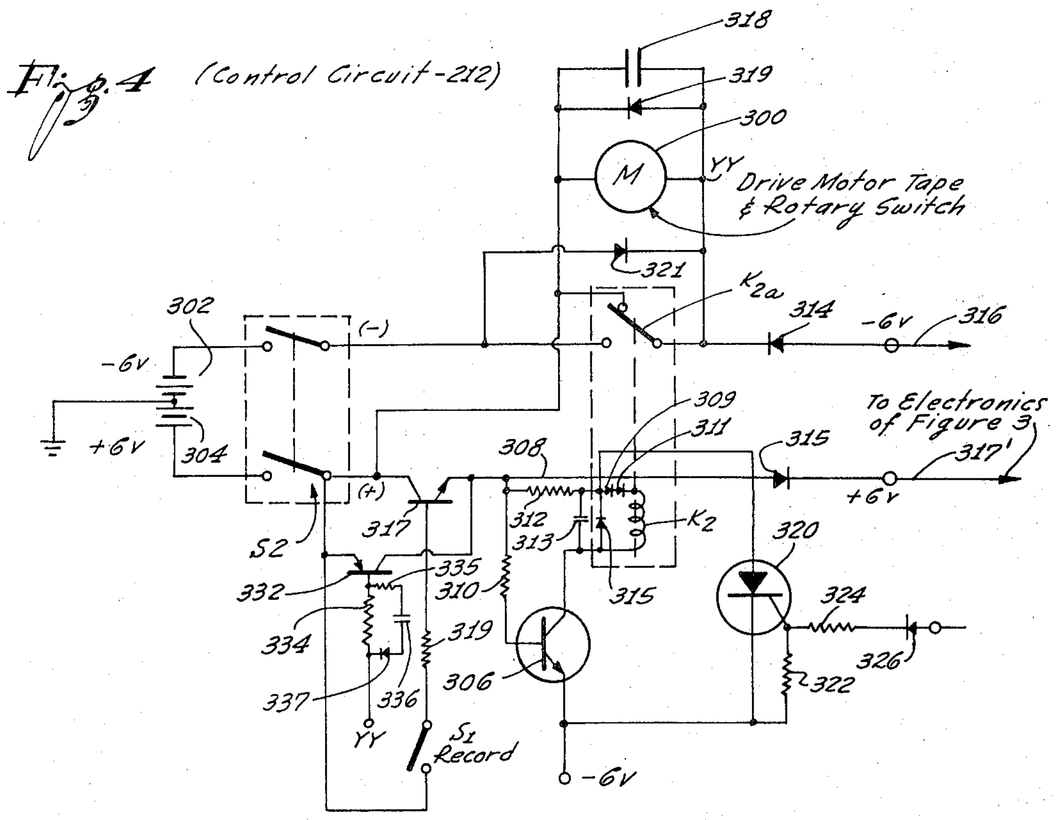
Fig. 4 (Control Circuit-212)
INVENTOR:
Jacob Chapsky
By Keith D. Beecher
Attorney INVENTOR.
Jacob Chapsky
By Keith D Beecher
Attorney Jan. 14, 1969 J. CHAPSKY 3,422,441

BINARY CODE DATA RECORDER SYSTEM

Filed Sept. 13, 1965 Sheet 4 of 4

INVENTOR:
Jacob Chapsky
By Keith D. Beecher
Attorney

United States Patent Office 3,422,441
Patented Jan. 14, 1969

3,422,441

BINARY CODE DATA RECORDER SYSTEM

Jacob Chapsky, Los Angeles, Calif., assignor, by mesne assignments, to Lockheed Aircraft Corporation, Plainfield N.J., a corporation of California Filed Sept. 13, 1965, Ser. No. 486,896
U.S. Cl. 346—74 5 Claims
Int. Cl. G01d 15/06; 15/12

ABSTRACT OF THE DISCLOSURE

A binary data magnetic recorder featuring a plurality of silicon controlled switching circuits coupled to a corresponding plurality of recording heads and biased to produce current flow through selected recording heads in response to binary coded data applied to the switching circuits through a buffer network. A rotary switch moves the system through a series of recording frames and resets the silicon controlled switching circuits to their initial state between each frame.

The present invention is directed to magnetic recording systems and it is particularly concerned with a improved and simplified version of a digital magnetic tape recording system of the type described in copending application Ser. No. 365,019, which was filed May 5, 1964.

The type of recording system described in the copending application, and with which the present invention is concerned, is one having particular utility in recording digital data derived from domestic watt hour meters, and the like.

When so use, each meter is equipped with a digital encoder, such as described in copending application 350,197, which was filed Mar. 9, 1964, now Patent No. 3,299,423, in the name of Chapsky et al. This encoder, when coupled to the meter, provides digital outputs corresponding to the instantaneous meter readings.

The outputs from the encoder are recorded, for example, by the recording system of the present invention. Then, the recorded data may later be fed into appropriate electronic data processing systems at a central billing office.

However, the recording apparatus and system of the present invention, like that of the copending application Ser. No. 365,019, has general utility. That is, the system of the invention can be used in any environment in which digital data is to be acquired for subsequent processing.

The recording system to be described herein is also capable of manual operation. That is, it can be used, for example, to record readings of a meter without the need for the aforesaid encoder. When so used, the operator merely adjusts manual switches on the recorder to positions corresponding to the readings of the meter, the readings having been made visually by the operator.

The recording system described in the copending application Ser. No. 365,019 makes use of a plurality of flip-flops associated with a corresponding plurality of electromagnetic recording heads. The state of the respective flip-flops determines whether the corresponding recording heads will record a binary "1" or a binary "0" on the magnetic tape. The flip-flops are initially placed in their reset condition. Then, as the binary data is received, the flip-flops are selectively triggered to their set condition, so that corresponding "1's" may be recorded on the tape.

In each instance, after a "1" has been recorded the triggered flip-flop is returned to its reset condition.

The use of such flip-flops, however, adds to the complexity and cost of the system.

Also, for the proper operation of the system of the copending application, it is essential that the initial states of all the flip-flops be referenced either to a set or reset condition. However, there is a tendency for any of the flip-flops to assume either one of the two conditions.

Therefore, additional circuitry is required in the system of the copending application for positively providing a reset signal, for example, for each flip-flop, and for applying that signal to the flip-flops at the proper time, and with sufficient duration, so as to assure that the flip-flops will be returned to their reset condition.

In the embodiment of the invention to be described herein, the flip-flops of the previous application are replaced by silicon controlled switching circuits; and circuit modifications are made, as will be described, so as to enable the silicon controlled switching circuits to be reset by means of a simple controlled break in the common return connection of the silicon controlled switching circuits.

Also, the silicon controlled switching circuits of the present invention automatically assume a reference condition when the power is first turned on. This means that no extraneous circuitry need be provided to assure that all the switching circuits are in their reference condition at the outset of operation of the system.

An object of the invention, therefore, is to provide an improved recording system, which is accurate and reliable in its operation, and which is particularly suited for recording digital data.

Another object of the invention is to provide such an improved recording system which is capable of increased speed and increased bit recording density as compared with other systems of the same general type.

Yet another object of the invention is to provide such an improved recording system which is relatively simple in its construction, as compared with other systems of the same general type.

Other objects and advantages of the invention will become apparent from a consideration of the following description, when the description is taken in conjunction with the accompanying drawings, in which:

FIGURE 2 is a diagram of a portion of a magnetic tape, on an enlarged scale, showing the manner in which data may be recorded on the tape in the practice of the present invention;

FIGURE 4 is a circuit diagram of a control circuit which is included in the system of FIGURE 3.

The recording system of the present invention, as explained above, is particularly useful in conjunction with the reading of domestic utility meters. As also explained, the meter may incorporate a suitable encoder, so that its readings are converted into binary signals. When that is effectuated, the recording system of the present invention may be plugged into an appropriate receptacle, so that the binary signals indicative of the instantaneous reading of the meter may be recorded.

In addition, the recording system of the invention includes manually operated switches. This permits the operator to read the utility meter and then to adjust the switches to settings corresponding to the readings of the meter. This obviates any need to incorporate the aforesaid encoder into the meter.

Figures 1, 3A:
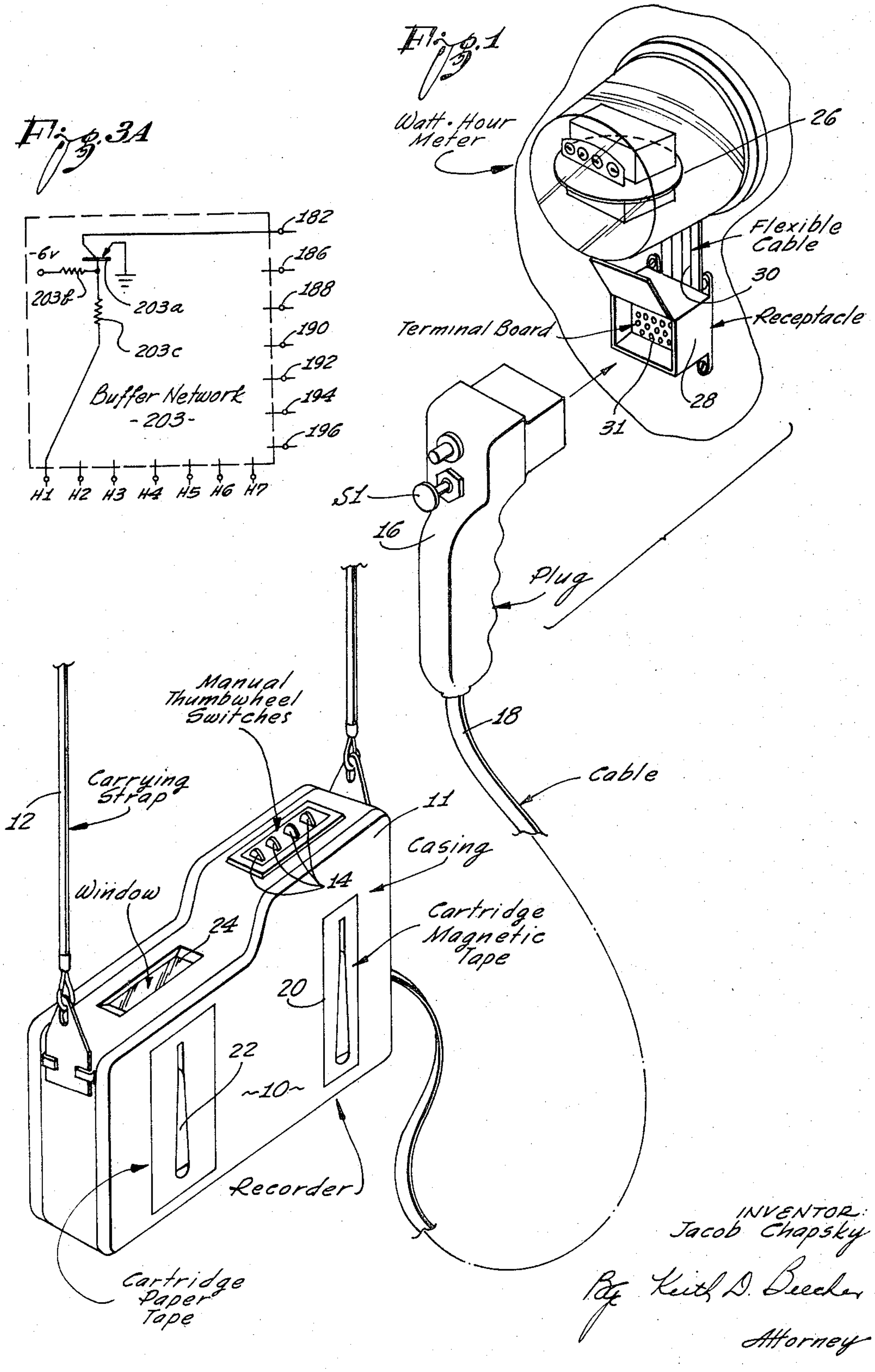
FIGURE 1 is a schematic diagram illustrating in perspective apparatus which may incorporate the recording system of the present invention, and the manner in which the apparatus may be used to obtain the readings of a domestic utility watt hour meter, when such a meter incorporates an appropriate encoder which converts its readings into binary signals.
FIGURE 3A is a circuit diagram of a buffer network included in the system of FIGURE 3.

The recording apparatus shown in FIGURE 1 may be similar to that described and claimed, for example, in copending application 365,018, which was filed May 5, 1964, and now abandoned, in the name of Hood et al. The recording apparatus is designated generally as 10.

The recording apparatus 10 is equipped with a carrying strap 12 which may, for example, be slung over the shoulder of the meter man. The recording apparatus 10 is also provided with a plurality of manually controlled thumb wheel switches 14. These switches, as explained above, may be set by the meter man to positions corresponding to the readings of the particular utility meter.

The apparatus and system of the invention, however, may be used to record the readings of the meter automatically when, as mentioned above, the meter is equipped with a suitable encoder, such as illustrated in FIGURE 1.

A plug 16 is connected to the recording apparatus 10 of FIGURE 1. The plug may have a pistol-like grip, as illustrated, for convenience in handling by the meter man. The plug is electrically connected to the recording apparatus 10 by means, for example, of a multi-conductor electric cable 18.

A cartridge 20 is removably mounted in the casing 11 of the recording apparatus 10, and this casing includes a magnetic tape transport mechanism, as fully described in the copending application Ser. No. 365,018.

The cartridge 20 may be inserted into the casing 11, so that a set of recordings may be obtained. Then, the cartridge may be removed at the central station, so that its recorded information may be processed. A new cartridge may then be inserted into the casing 11, to place the recording apparatus in condition to receive a new set of recordings.

A second cartridge 22 is also illustrated as removably mounted in the casing 11 of the recording apparatus. The latter cartridge may include a mechanism for moving a paper tape past an observation window 24 in the casing 11. The paper tape may have, for example, information on it indicating to the meter man the location at which the next reading is to be taken.

A utility meter, such as a usual watt hour meter 26, is also shown in FIGURE 1. A suitable encoder, such as described, for example, in the aforementioned copending application Ser. No. 350,197, is installed in the meter 26, and the resulting electrical binary signals, corresponding to the instantaneous meter readings, are introduced to a receptacle 28 by means of a flexible cable 30.

The receptacle 28 may be similar, for example, to the receptacle described in copending application Ser. No. 254,620, filed Jan. 29, 1963, now Patent No. 3,193,635. This latter copending application describes a receptacle which not only provides electrical connections to the encoder in the meter 24, but also provides data identifying the particular meter. This latter data also comprises sets of binary signals indicating, for example, the serial number of the particular meter, the area code, and the rate code.

It will be appreciated, therefore, that when the meter 26 is equipped with an encoder, the meter man merely plugs his plug 16 into the terminal board 31 in the receptacle 28. He then depresses a push-button switch 51. This causes the magnetic tape in the cartridge 20 in the recording apparatus to be moved through a field or block of data, representing a predetermined number of frames corresponding to the particular customer's reading. During the recording process, an indicator lamp 38 is energized. In the system to be described, the recorder actually moves through two fields, for redundancy check purposes, each time the switch S1 is actuated.

The binary coded data recorded on the tape in the recording apparatus represents the reading of the meter 26 at the particular time that the plug 16 is plugged into the receptacle 28. The binary data representing the serial number of the meter may also be recorded on the tape, as will be described. In addition, and if required, the above-mentioned further information may be recorded on the tape in binary coded form, so as to indicate the area code and the rate code, as mentioned.

As mentioned above and as will be described, whenever the push-button switch S1 is depressed, the information from the meter 26 is recorded twice on the magnetic tape 25. The two recording fields are subsequently compared by the automatic processing system at the central station so that a redundancy check may be made. If there is any discrepancy between the two recordings, they are automatically discarded by the processing system.

As mentioned above, the schematic representation of FIGURE 2 shows, on an enlarged scale, a portion of a magnetic tape 25 which is mounted on the cartridge 20 and which is drawn through the recording apparatus 10. The digital information from the meter 26 is recorded along adjacent channels on the tape in a series of frames F1–F12. In the illustrated example, one of the channels, such as channel #7, receives clock pulses, and these are recorded at each successive frame (F1–F12). The twelve frames in the illustrated embodiment, constitute the block of data, and (as explained) each block is recorded twice.

The channels #1–#4 on the tape 25 serve as data channels, and the binary bits representing the information derived from the encoder in the meter 26, or by a setting of the manual switches 14, are recorded in parallel across these channels in each frame on the tape.

As described in the aforementioned copending application 350,197, the encoder in the meter 26 also provides interpolation information, so that appropriate corrections can be made automatically at the central station to resolve reading ambiguities.

This interpolation information is recorded, for example on channel #5 of the tape. Channel #6 on the tape may constitute an error channel, and a recording may be made on that channel when a particular pair of data blocks are in error and are to be disregarded by the data processing equipment at the central station.

Figure 3:
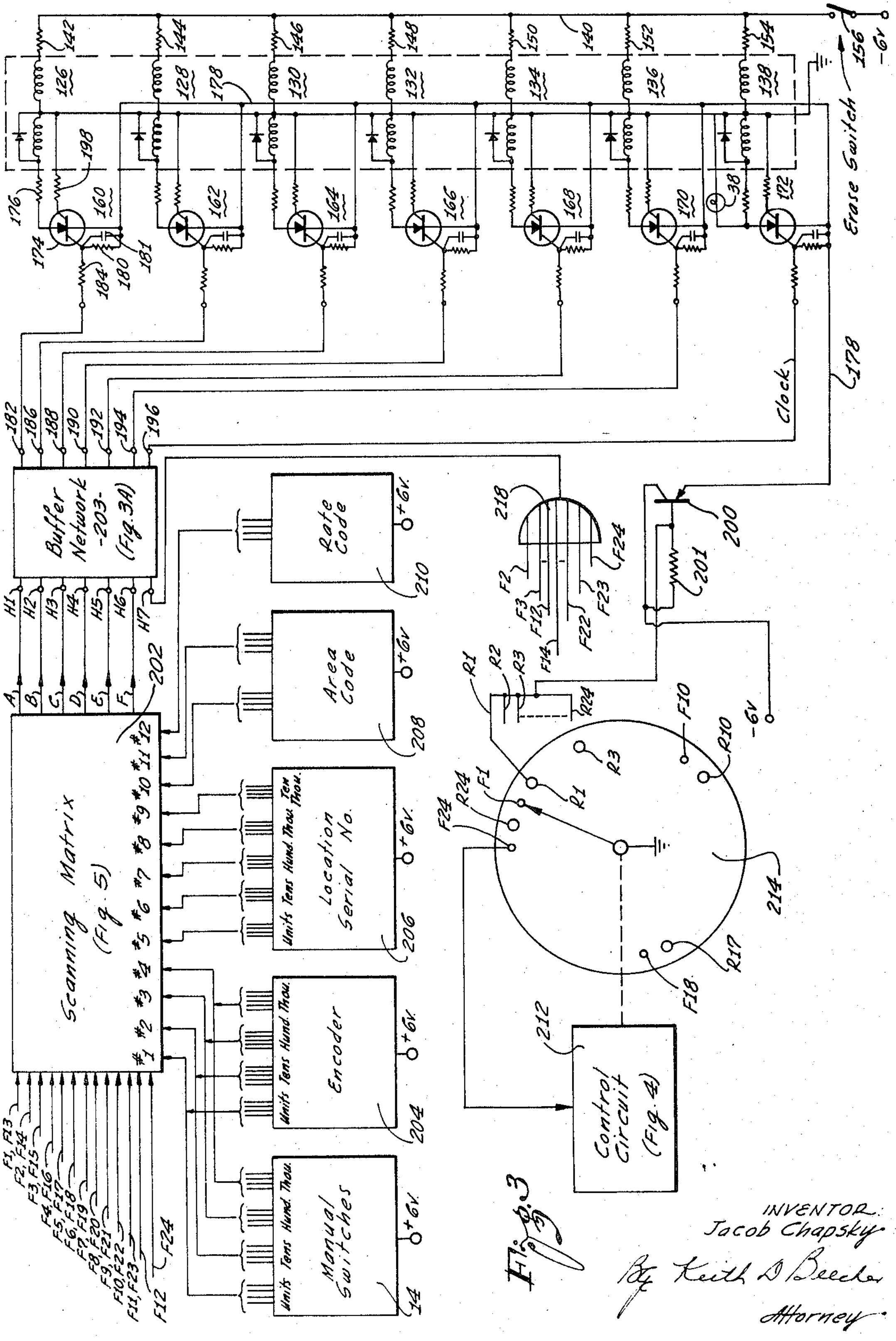
FIGURE 3 is a circuit diagram of the recording system of the invention, by which the data is timed and framed for recording on the magnetic tape of FIGURE 2.

The recording along the channels #1–#7 of the magnetic tape of FIGURE 2 is carried out by a group of electro-magnetic recording heads 126, 128, 130, 132, 134, 136 and 138 shown diagrammatically in FIGURE 3. These recording heads are mounted in the recorder 10 to be positioned adjacent the path taken by the magnetic tape 25 in the apparatus 10 of FIGURE 1 when the cartridge 20 is in place, so that each recording head will record information in a corresponding one of the seven channels #1–#7 on the tape. The system of FIGURE 3 which is associated with the recording heads is also mounted in the recorder 10.

It will be observed that each of the recording heads includes a pair of windings. These windings, in each instance, have a common connection connected to a point of reference potential, such as ground. The right hand windings of the recording heads are connected to a common lead 140 through respective resistors 142, 144, 146, 148, 150, 152 and 154. Each of these resistors may, for example, have a resistance of 536 ohms.

The common lead 140 is connected through a switch

156 to the negative terminal of a 6-volt D.C. source. Whenever the switch 156 is closed, current flows through the right hand windings of each of the heads, so as to provide a selected magnetic polarity to the tape, corresponding to a reset or erased condition of the tape which, in turn, may correspond, for example, to binary "O."

The left hand windings of the recording heads 126, 128, 130, 132, 134, 136 and 138 are respectively connected to a corresponding plurality of silicon controlled switching circuits designated 160, 162, 164, 166, 168, 170, and 172. A diode is connected across each of the windings, as shown. The diode serves to clamp the inductive kick of the head inductance after its associated silicon controlled switching circuit is turned off.

The silicon controlled switching circuits may be similar and each, like the switching circuit 160, for example, may include a silicon controlled switch 174. The anode of the silicon controlled switch 174 is connected through a 536 ohm resistor 176 to the ungrounded terminal of the left hand winding of the recording head 126.

The cathode of the silicon controlled switch 174 is connected to a common lead 178. The cathode gate electrode of the silicon controlled switch 174 is connected to a resistor 180 which may, for example, have a resistance of 4.7 kilo-ohms, and which is connected to the cathode of the silicon controlled switch. A capacitor of .01 microfarad is connected across the resistor 180. This capacitor helps prevent false firing of the silicon controlled switch by noise spikes.

The switching circuit 160 has an input terminal 182 which is connected through a 4.7 kilo-ohm resistor 184 to the cathode gate electrode of the silicon controlled switch 174. The switching circuits 162, 164, 166, 168, 170 and 172 have corresponding input terminals 186, 188, 190, 192, 193, and 196. The silicon controlled switch 174 includes an annode gate which is connected to a grounded resistor 198 having a resistance, for example, of 180 kilo-ohms.

The common lead 178 is connected to the emitter of a PNP transistor 200 which is connected to function as a switch. The transistor 200 may be of the type presently designated 2N1305. The collector of the transistor is returned to the negative terminal of the 6 v. D.C. source, and the base is connected to the collector through a 470 ohm resistor 201.

The system of FIGURE 3 also includes a scanning matrix 202 which will be described in further detail in FIGURE 5. The scanning matrix has output terminals A, B, C, D, E, F, respectively connected through a buffer 203 to the input terminals 182, 186, 188, 190, 192 and 194 of the silicon controlled switching circuits 160, 162, 164, 166, 168 and 170.

The buffer 203 includes a plurality of like transistor circuits, one of which is shown in FIGURE 3A. Each of the transistor circuits includes, for example, a PNP transistor **203*a* having its emitter grounded and having its base connected through a 12 kilo-ohm resistor 203*b* to the negative terminal of the 6 volt D.C. source. The input terminal $H_1$, of the buffer, for example, is connected through a 5.6 kilo-ohm resistor 203*c* to the base of the transistor 203*a*. The collector of the transistor is connected to the input terminal 182**, for example.

The manual switches 14 on the recording apparatus of FIGURE 1 may be adjusted to provide digital outputs, as shown by the block of FIGURE 3, corresponding to the readings of any particular meter.

It will be appreciated that most utility meters provide separate decimal readings on respective units, tens, hundreds, and thousands scales. When only four manual switches 14 are provided, each such scale must be read separately into the recorder. However, when sixteen manual switches are provided, a complete setting of all the scales of the meter reading can be made at once. Then the complete reading of the meter can be scanned into the recorder 10 by the matrix 202.

This setting of the manual switches serves to convert the meter reading into electrical signals, as represented by a —6 or a 0 potential on the corresponding output lead. These leads are connected, for example, in groups of four to the inputs #1–#4 of the scanning matrix 202. It will be appreciated that the scanning matrix 202 includes four separate terminals at the input #1, and a corresponding plurality of input terminals at the input #2, and so on.

In fact, at each of the inputs #2, #3, and #4 of the scanning matrix 202, and as will be described in more detail in conjunction with FIGURE 5, five separate input terminals are provided. Then, if the recorder is to be used in conjunction with an encoder in the watt hour meter 26, as indicated by the block 204 in FIGURE 3, the aforementioned interpolation outputs can be handled by the fifth input terminal.

As shown by the block diagram of FIGURE 3, the outputs from the manual switches 14, or the outputs from the encoder 204, can be introduced to the matrix 202, depending upon whether a manual or automatic readings of the meter are being taken.

Also, a block 206 is provided which provides outputs in groups extending through units, tens, hundreds, thousands, and ten thousands; and representing in binary coded form, the serial number of the particular meter being read at any particular time. These latter outputs are introduced, in groups of fours, to separate terminals at each of the inputs #5, #6, #7, #8, and #9 of the scanning matrix 202.

Likewise, an area code may be provided by the block 208 which is introduced, in groups of fours, to the inputs #10 and #11 of the scanning matrix; and a rate code may be provided by the block 210 which is introduced, in a group of four, to the input #12 of the scanning matrix 202.

The system of FIGURE 3 also includes a control circuit 212 which will be described in conjunction with FIGURE 4. This control circuit, in turn, includes a drive motor for driving the magnetic tape 25 in the cartridge 20, when the cartridge is in place. This drive motor also drives a rotary switch 214.

The rotary switch 214 has a first set of terminals designated F1–F24 which are successively engaged by the grounded armature of the switch as the armature is rotated. The switch 214 also has a series of reset terminals designated R1–R24 which are interposed between the terminals F1–F24, and which are likewise successively engaged by the grounded armature of the switch, as the armature is rotated. The switch 214 may also have a series of further terminals interposed, for example, between each "set" terminal and the preceding "reset" terminal. These latter terminals may provide notification signals to external electronics before each set terminal is grounded by the armature.

It will be appreciated that in the particular embodiment under consideration, twelve separate frames F1–F12 are introduced to the scanning matrix 202 to constitute the first data block, and the rotary switch 214 scans each frame in succession, as indicated by the corresponding inputs F1–F12 to the scanning matrix. The switch then scans a second set of frames F13–F24, so as to provide the second redundancy data block on the tape 25, as shown in FIGURE 2.

The terminals F1–F24 of the switch 214 are also connected to an "or" gate 218 which, in turn, is connected through the buffer to the input terminal 196 of the silicon controlled switching circuit 172. This connection provides for a triggering of the switching circuit 172 for every set terminal (except F1 and F13) engaged on the rotary switch 214, so that corresponding clock pulses may be recorded on the tape, as shown by the channel #7 in FIGURE 2. In FIGURE 5, the input terminal of the top right transistor 400 is connected to the +6 volts. When either of the set terminals $f_1$ or $f_{13}$ is engaged by the grounded armature of the switch 214, a character "1" will be written on track #6, but the switching circuit 172 will be prevented from firing (or prevented from writing a "1" in the clock track #7). Thus, the absence of a "1" on the track #7 and the presence of a "1" on the track #6 represent the beginning of a word.

The reset terminals R1–R24 of the switch 214 are connected together, and these terminals are connected to the base of the switching transistor 200. These connections provide that each time the armature of the switch 214 contacts an "F" contact, a corresponding line in the scanning matrix 202 is activated, and then when the armature contacts the next "R" contact, the transistor 200 is switched from a conductive to a non-conductive state, to open the common return connection 178. This latter action returns all the silicon controlled switch circuits 160, 162, 164, 166, 168, 170 and 172 to their original reset state.

When the system is first turned on, the drive motor 300 (FIGURE 4) in the control circuit 212 starts the tape 25, and at the same time the motor moves the armature of the rotary switch 214 to the R24 contact, so that the switching transistor 200 is briefly turned off to open the return connection 178 and cause all the silicon controlled switching circuits to be in their reset state.

Then, the armature of the switch 214 moves to the contact F1. This causes the first clock pulse to be recorded on the #6 track of the tape (to indicate the beginning of a word). Also, this energizes the first line of the scanning matrix 202. This means that the four signals applied to the separate four terminals of input #1 of the scanning matrix 202 appear across the output terminals A, B, C and D of the matrix, so that the switching circuits 160, 162, 164, and 166 are actuated selectively, depending upon which of the four inputs is a binary "1", and which is a binary "0". This action causes the "1's" to be recorded on the channels #1, #2, #3 and #4 for the first frame F1 on the tape 25, as shown in FIGURE 2. Also, a "1" is written on track #6 to indicate the beginning of a word.

Then, the armature of the switch 214 moves to the reset terminal R1 so that all the switching circuits are reset, and it then moves to the terminal F2, so that the scanning process may be continued.

In this manner, the scanning continues from frame to frame, as shown in FIGURE 2, until frame 12 (F12) is reached. Then, for frame 13 (F13), the scanning is repeated so as to provide the redundancy block. Finally, when the contact F24 is reached, the control circuit is caused to stop the motor 300 immediately, and to await the next operational cycle which is initiated when the switch S1 (FIGURE 1) is again depressed.

The control circuit 212, as shown in FIGURE 4, includes a negative DC potential source 302 and a positive DC potential source 304, both these sources being referenced to ground. A double-pole, single-throw battery switch S2 is included in the circuit.

The control circuit 212 also includes a relay K2, the coil of which is connected to the collector of an NPN transistor 306. The base of the transistor is connected to a lead 308 through a 4.7 kilo-ohm resistor 310. The other side of the relay coil of the relay K2 is connected to the lead 308 through a 100 resistor 312 and through two diodes 309 and 311. A .0015 microfarad capacitor 313 and a shunting diode 315 are connected across the two diodes and the relay coil K2. The record switch S1 connects the base of an NPN transistor 317 to the positive battery terminal through a resistor 319. The transistor has its collector connected to the positive terminal and its emitter is connected to the lead 308. The transistor 317 may be of the type designated 2N3242.

The relay K2 includes a single armature K2*a*. The armature K2*a* is connected to the cathode of diode 314. The anode of the diode 314 is connected to a lead 316 which supplies 6-volt negative potential to the system of FIGURE 3. The lead 308, on the other hand, is connected to the anode of a diode 315. The cathode of the diode 315 is connected to a lead 317′ which supplies 6-volt positive potential to the system.

The relay K2 has a normally-closed contact engaged by the armature K2*a*, and this contact and the armature are connected across the motor 300. A .1 microfarad capacitor 318 is also connected across the motor, as is a diode 319.

A normally-open contact associated with the armature K2*a* is connected through the switch S2 to the negative terminal of the D.C. source 302. A further diode 321 is connected between the motor and the normally-open contact. The diodes 319 and 321 serve to supress transient noise pulses.

A silicon controlled rectifier 320 has its anode connected to the junction of the resistor 312 and diode 309; and the cathode of the silicon controlled rectifier, together with the emitter of the transistor 306, are connected to the negative terminal of the 6-volt source 302.

The gate of the silicon controlled rectifier is connected through a 4.7 kilo-ohm resistor 322 to the cathode, and through a similar resistor 324 to the cathode of a diode 326. The diode receives respective resetting signals, which serve to stop the motor 300. For the incremental mode of operation, all the reset terminals of the switch 214 (FIGURE 3) are connected to the cathode of the diode 326.

A PNP transistor 332, which may be of the type designated 2N1305, has its emitter connected to the positive terminal of the source 304, and has its collector connected to the emitter of the transistor 317. The base of the transistor 332 is connected through a 4.7 kilo-ohm resistor 334 to the terminal YY of the motor 300. The circuit of the transistor serves as a holding circuit. A resistor 335 of 470 ohms, and a 6.8 microfarad capacitor 336 and a diode 337 are connected in series across the resistor 334. These series-connected elements eliminate the effect resulting from contact bounce of the relay K2 when the motor M is brought to a stop.

An "end of tape" reset signal may be applied to the diode 326, the reset signal from the R24 terminal of the switch 214 of FIGURE 3 may also be applied to the diode 326. Any further reset signal may also be applied to the diode 326, and other circuits may be included for stopping the movement of the tape, upon the happening of any particular occurrence.

For example, the system of the invention may be established in an incremental mode, whereby the tape is moved only from one frame to the next whenever the start button S1 is depressed.

This can be achieved by connecting the common lead, extending in FIGURE 3, to the base of the transistor 200, to the diode 326 in FIGURE 4. This connection will cause the motor M to stop each time a frame has been recorded, and the button S1 must again be pressed in order to record the next frame.

When the record switch S1 is closed, for example, the relay K2 is energized, so that the motor 300 is connected across the plus and minus battery leads, and to permit plus and minus voltage to be supplied to the system of FIGURE 3 by way of the leads 308 and 316.

When the switch S1 is first closed, the transistor 317 is turned on to apply +6 volts to the base of the transistor 306. The transistor 306 is then energized so as to supply the required current to the coil of the relay K2. The potential of the terminal YY changes from +6 volts to −6 volts, and this causes the holding transistor 332 to saturate and provide a latching action for the relay, so that the system remains energized, even if the push-button switch S1 is released, this energization continuing until the end of the cycle.

At the end of the cycle, the R24 contact is engaged so as to ground the anode of the diode 326 causing the silicon controlled rectifier 320 to fire. This places the forward drop voltage of the silicon controlled rectifier (about .7 volts) across the coil of the relay K2, so that the relay opens K2. When the relay K2 opens, the armature K2a engages its normally-closed contact, so as to place a direct short circuit across the motor 300. This provides a breaking for the motor, so that the motor immediately stops. At the same time, the power to he system of FIGURE 3 is cut off by the control circuit.

Even if the switch S1 is held closed throughout the entire cycle, the circuit still turns off at the end of the cycle, and remains turned off until the switch S1 is opened and again closed. This provides a fool-proof system, in that the meter man merely plugs in his apparatus, as shown in FIGURE 1, and depresses the switch S1. This causes the system to undergo a complete cycle, regardless of whether the switch S1 is immediately released or not. Then, a subsequent cycle cannot be initiated, until the switch is again depressed.

Figure 5:
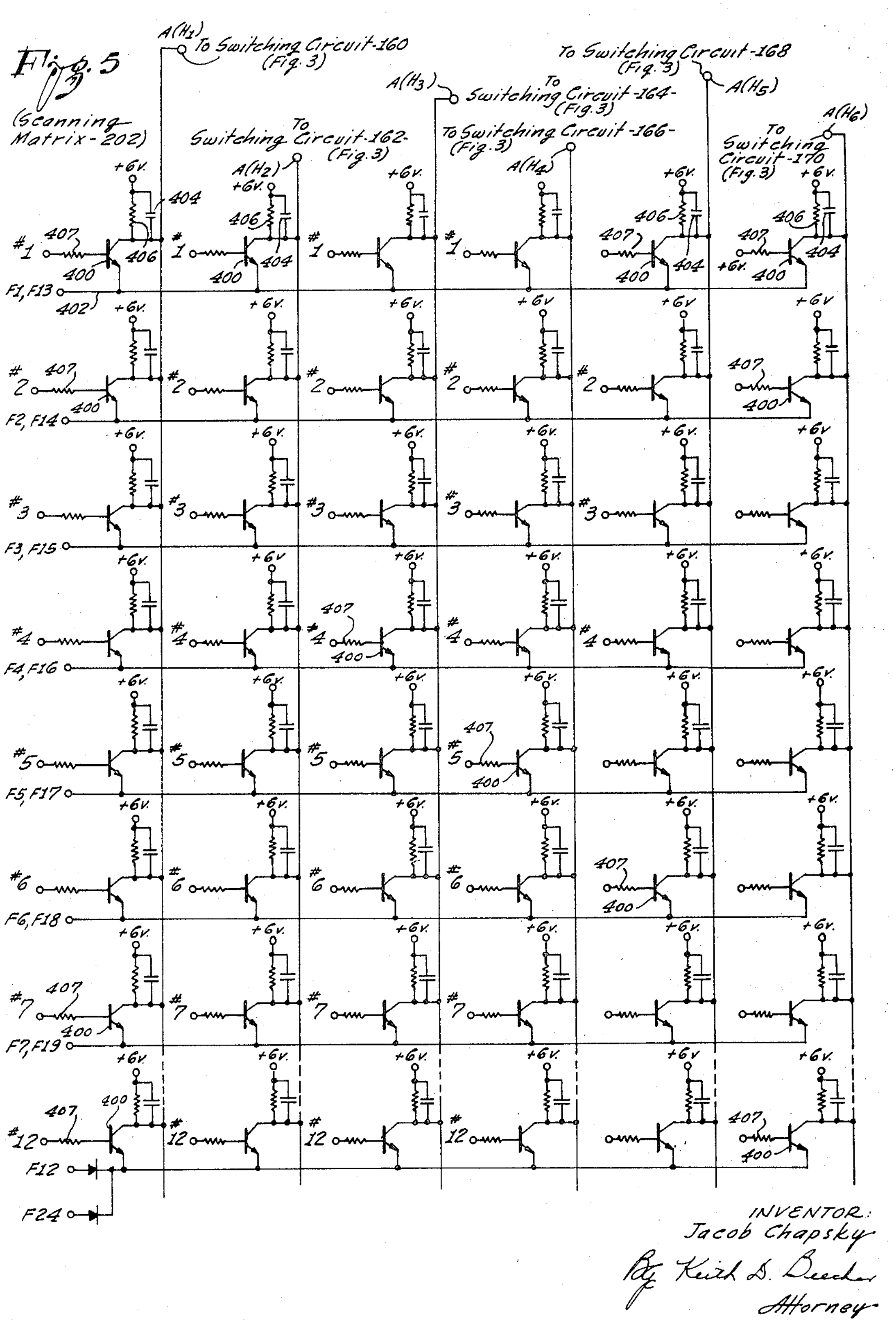
FIGURE 5 is a circuit diagram of a scanning matrix which is also included in the system of FIGURE 3.

The scanning matrix 202, as shown in FIGURE 5, includes a plurality of transistor circuits. Each of the circuits, for example, may include an NPN transistor 400. The transistor 400 appearing in the upper left hand corner of FIGURE 5 has its emitter connected to a common lead 402. The collector of the transistor is connected to the A output terminal of the scanning matrix, which, as described, is connected through the buffer 203 to the switching circuit 160 of FIGURE 3.

The collector of the transistor 400 is connected through a 1 kilo-ohm resistor 406 to the positive terminal of the 6-volt source, and the resistor is shunted by a .05 microfarad capacitor 404. A first of the input terminals #1 of the scanning matrix is connected to the base through a 4.7 kilo-ohm resistor 407.

The terminals F1 and F13 of the rotary switch 214 of FIGURE 3 are connected to the lead 402. It will be appreciated that when the rotary switch 214 has its armature, for example, on the terminal F1, the lead 402 is grounded. This means that the transistor circuit 408 of the transistor 400, as well as additional similar transistor circuits 410, 412 and 414 are all qualified.

The four activated transistor circuits are all connected to the separate input terminals associated with the input #1 of the scanning matrix, and correspond, for example, to the setting of the units manual switches of the block 14 in FIGURE 3, or the setting of the units converter in the encoder block 204 of FIGURE 3. Whenever any of the individual settings of this first group indicates a binary "1", for example, ground potential is introduced to its corresponding terminal at input #1 of the matrix, so that a triggering signal appears at the corresponding output terminal A, B, C or D of the matrix to actuate the corresponding switching circuit in FIGURE 3 through the corresponding buffer circuit in the network 203.

Likewise, the scanning continues through the F2, F3 . . . F12 terminals of the rotary switch 214 in FIGURE 3, and repeats for the F13–F24 terminals. It will be noted that the F12 and F24 terminals must be separated in the matrix of FIGURE 5, because the F24 terminal is also connected to the control circuit 212 and serves to stop the cycle.

In the manner described above, the system of the invention is capable of timing and framing the digital information, and of recording it in preselected frames on the magnetic tape 25 of FIGURE 2.

The use of the silicon controlled rectifier switching circuits in FIGURE 3 enables the system to be relatively simple. This is because the silicon controlled rectifier switching circuits normally assume a first state in which the silicon controlled rectifier included in the circuit is non-conductive.

The silicon controlled rectifier can be fired only when the appropriate signal is applied to its gate electrode. The resetting of the switching circuits is conveniently achieved merely by opening the connection in their return lead 178, by means of the switching transistor 200. This can be achieved by a brief turning off of the transistor 200, and no prolonged resetting signal is necessary, as is the case when flip-flops are used.

The resulting recording of the data, as mentioned above, can be fed directly into a computer or data processor. If the data is more than the computer can receiver on a continuous basis, a record gap of one or more fields can be provided on the tape.

This record gap provides a predetermined length of tape with no recorded information whatever, and this permits the computer to absorb the previously introduced data and to make provisions for the receipts of the next mass of data.

A record gap of .75 inch along the tape may be provided, for example, by causing the tape to move through one cycle of the control circuit 212 of FIGURE 4, with all the record heads deenergized. This could be achieved, for example, by placing a switch in the return lead 178 of FIGURE 3. The meter man opens that switch before he presses S1 in order to provide the desired record gap.

Lateral and longitudinal parties can both be generated by the recorder. Either by using all 96 segments in the commutator board, or by halfing the diameter of the recorder capstan, the recorder can write 100 bits per inch of tape on the "return-to-bias" mode recording. This looks to the computer like 200 bits per inch of N.R.2 type recording.

With longitudinal parity and record gap and lateral parity features incorporated into the recorder, and operating on 100 bits per inch return-to-bias mode; the recorder can write tapes which can be directly processed by the computer without any need for conversion in a usual tape-tape converter.

While a particular embodiment of the invention has been shown and described, modifications may be made. It is intended in the claims to cover all the modifications which fall within the spirit of the invention.

What is claimed is:

1. In a magnetic tape recording system which includes a plurality of electro-magnetic recording heads disposed adjacent the path of a magnetic tape for recording binary data in each of a plurality of channels on said tape; the combination of: a corresponding plurality of silicon controlled switching elements each having at least an anode, a cathode, and a gate electrode, means electrically coupling the anode of each silicon controlled switching element to a corresponding grounded recording head, a source of direct current electrical potential coupled to said cathode of each said silicon controlled switching element, impedance means coupling each said gate electrode to said source of electrical potential and normally biasing said silicon controlled switching elements non-conductive, and means for grounding selected control electrodes in response to binary coded data applied thereto for triggering certain of said silicon controlled switching elements to a conductive state providing current flow through said corresponding recording heads.

2. A device as defined in claim 1 wherein said means for grounding selected control electrodes is a transistor, the base electrode of which is selectively coupled to a source of electrical potential to render the transistor conductive.

3. A device as defined in claim 1 including switch means interposed between said source of electrical potential and said silicon controlled switching elements for selectively opening the circuit to restore said silicon controlled switching elements to their initial non-conducting state.

4. A device as defined in claim 3 wherein said switch means is normally conducting transistor which is base biased to cut-off on grounding said base.

5. A device as defined in claim 4 including rotary switch means selectively grounding the base of said transistor.

References Cited

UNITED STATES PATENTS

| | | | |
|---|---|---|---|
| 2,824,776 | 2/1958 | Elovic et al. | 346—74 |
| 3,020,117 | 2/1962 | Heijn et al. | 346—74 |
| 3,286,029 | 11/1966 | Simshauser et al. | 307—88.5 |

STANLEY M. URYNOWICZ, Jr., *Primary Examiner.*

J. F. BREIMAYER, *Assistant Examiner.*

U.S. Cl. X.R.

340—174.1